June 28, 1960

K. MAECKER 2,942,526

AUTOMATIC ELECTRIC CONTROL ARRANGEMENT FOR
A CRANKSHAFT MILLING MACHINE

Filed March 27, 1956

INVENTOR
Kurt MAECKER

BY
Michael S. Striker
Attorney

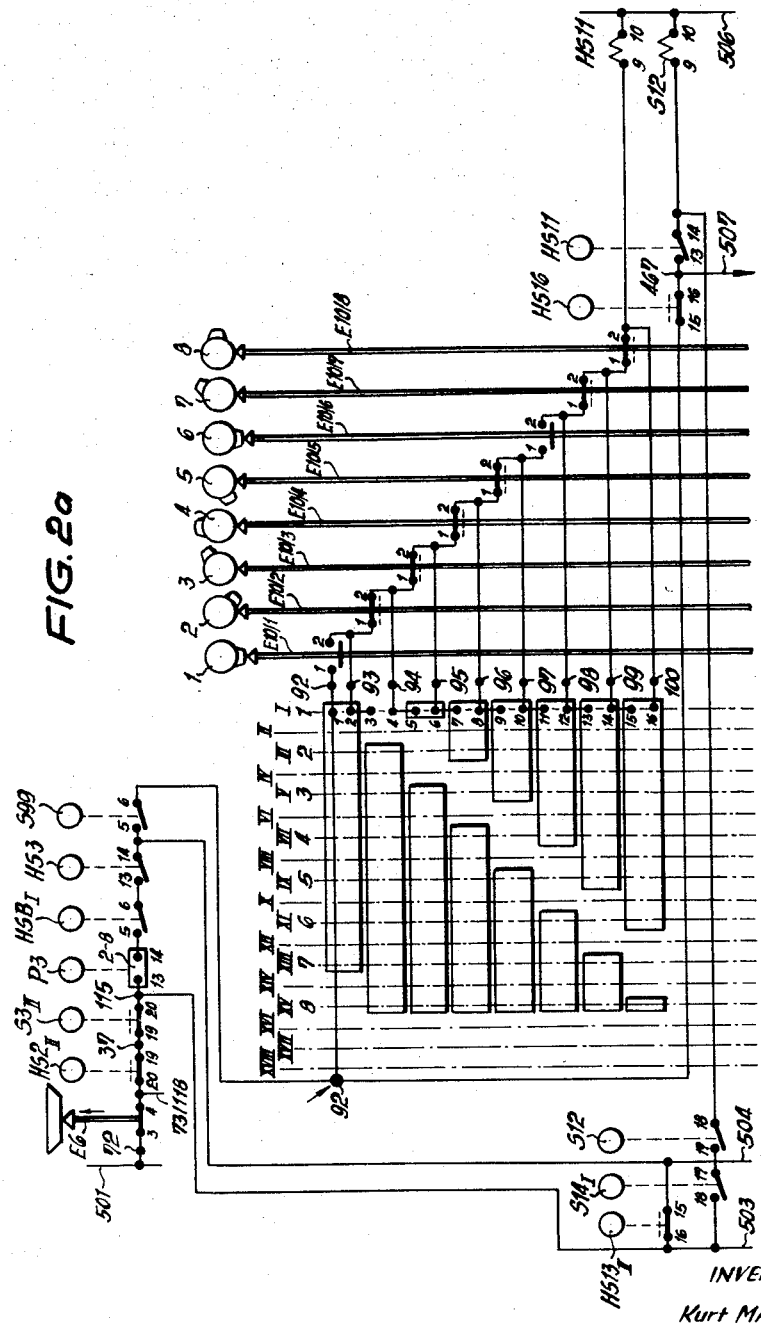

June 28, 1960  K. MAECKER  2,942,526
AUTOMATIC ELECTRIC CONTROL ARRANGEMENT FOR
A CRANKSHAFT MILLING MACHINE
Filed March 27, 1956  8 Sheets-Sheet 4
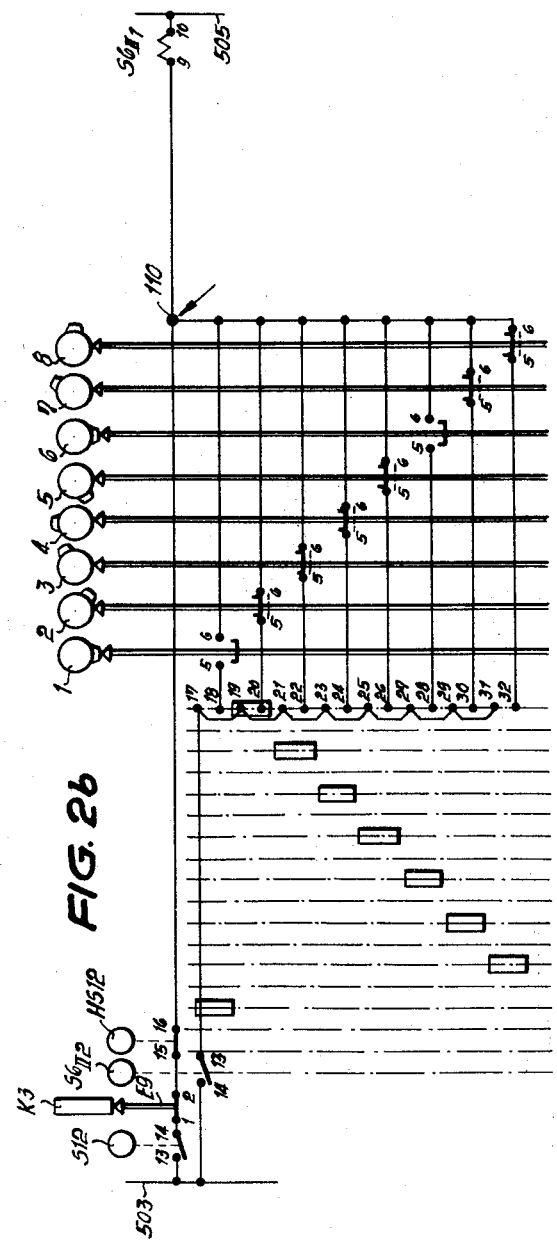
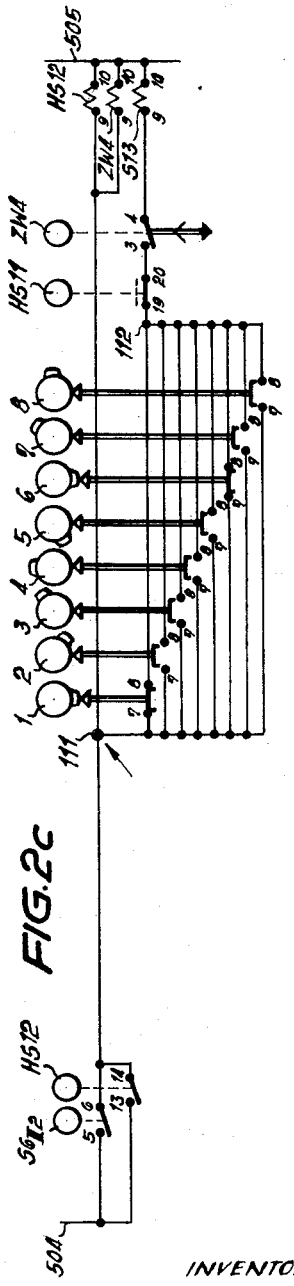
INVENTOR
Kurt MAECKER
BY
Michael S. Striker
Attorney

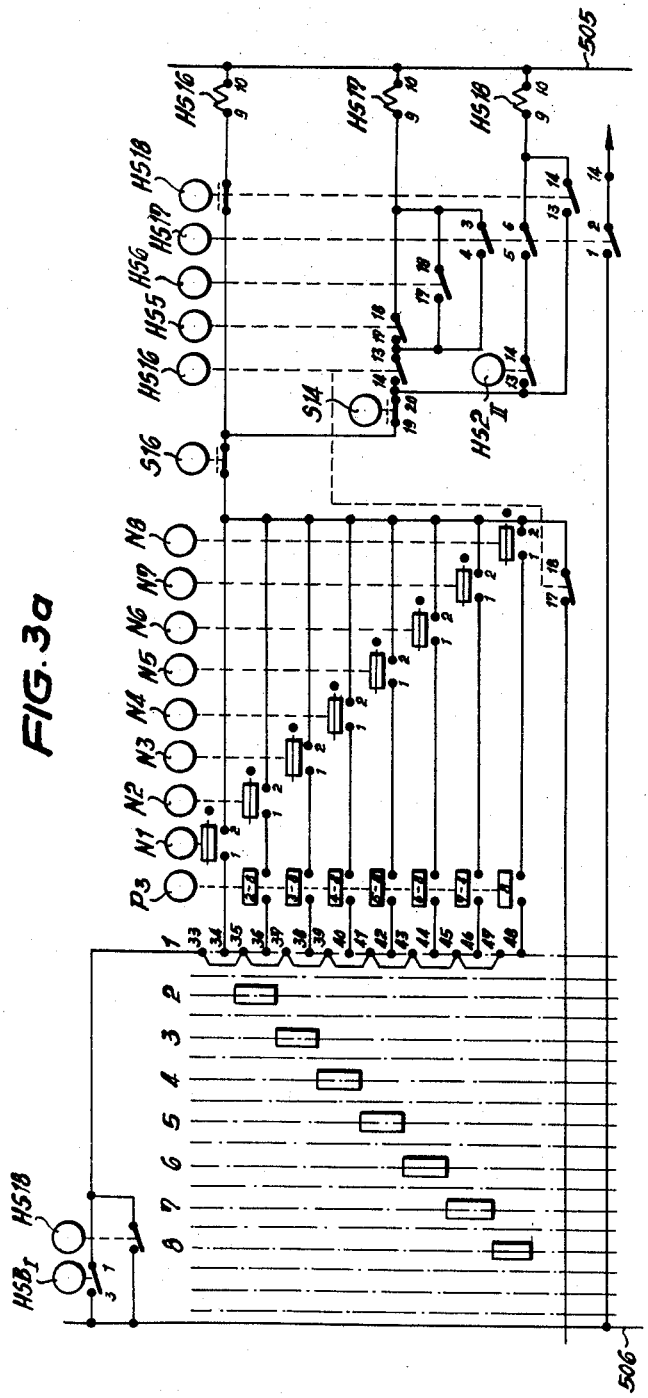

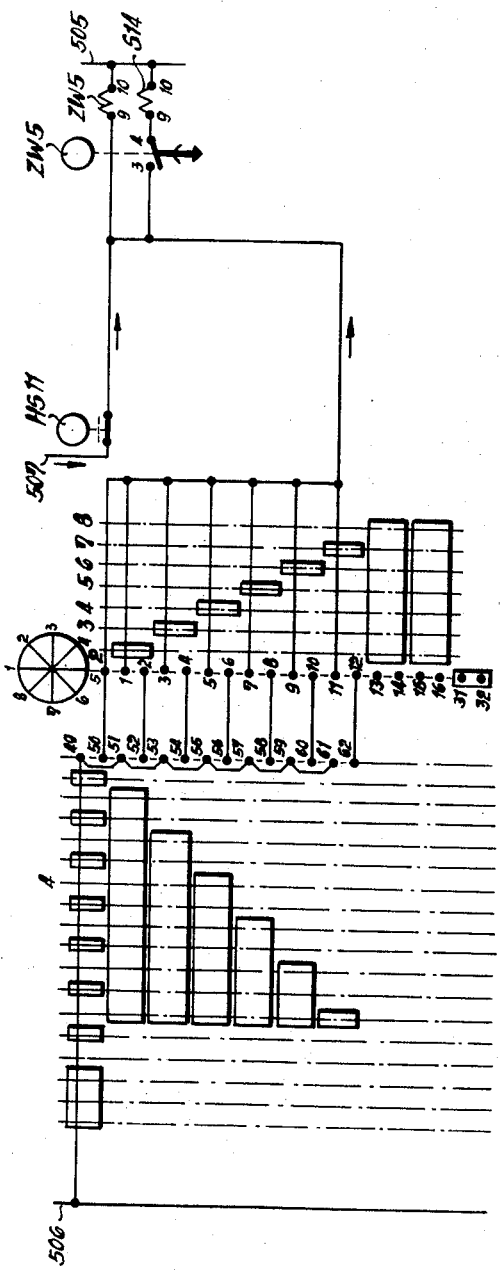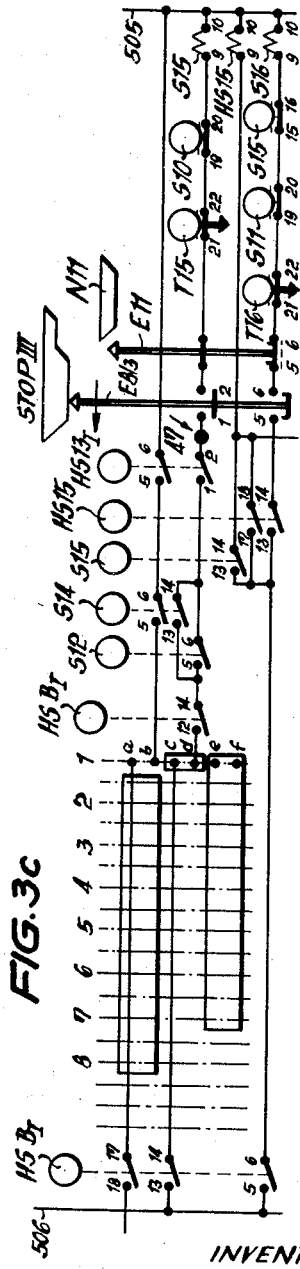
FIG.3b
FIG.3c

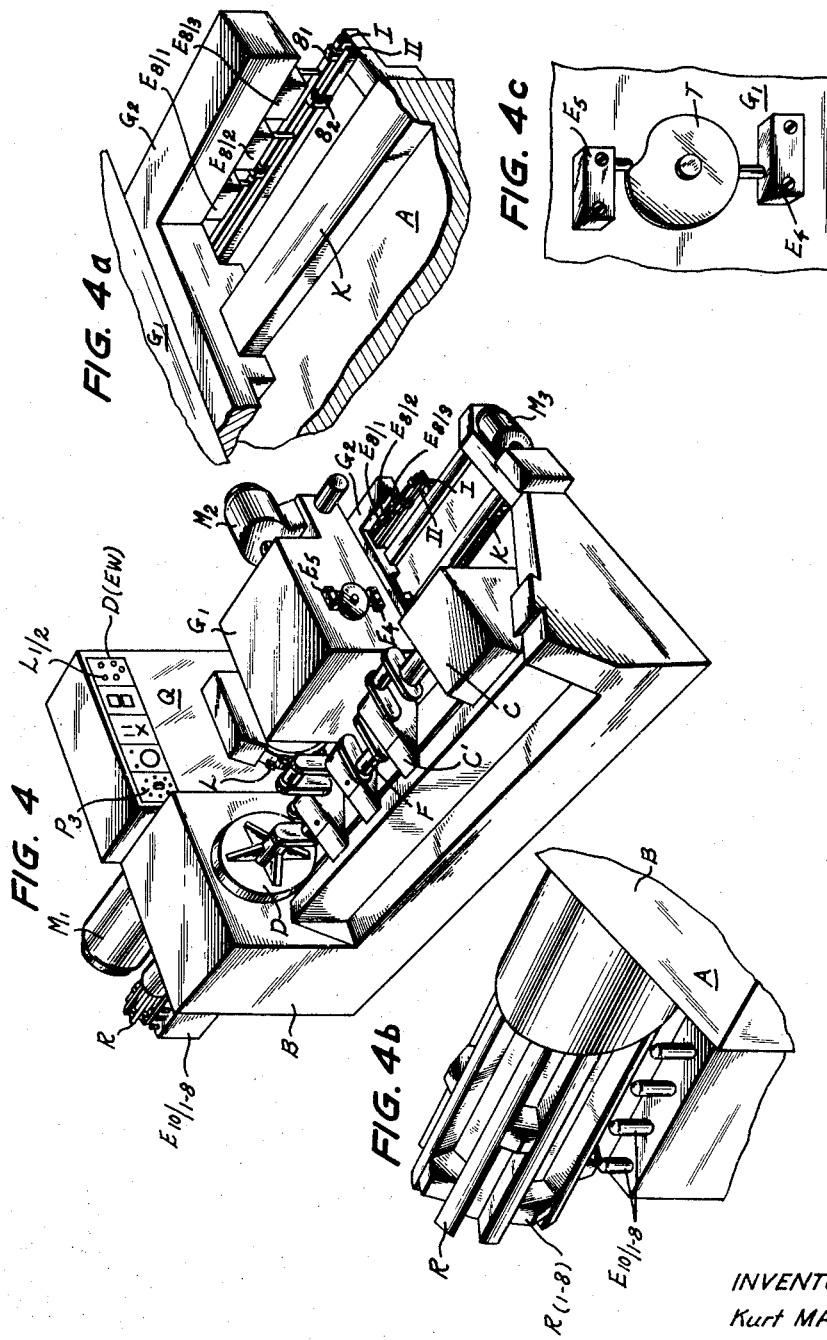

June 28, 1960 K. MAECKER 2,942,526
AUTOMATIC ELECTRIC CONTROL ARRANGEMENT FOR
A CRANKSHAFT MILLING MACHINE
Filed March 27, 1956 8 Sheets-Sheet 8

INVENTOR
Kurt MAECKER

United States Patent Office 2,942,526
Patented June 28, 1960

2,942,526
AUTOMATIC ELECTRIC CONTROL ARRANGEMENT FOR A CRANKSHAFT MILLING MACHINE

Kurt Maecker, Dusseldorf, Germany, assignor to Firma Elektroantrieb Kurt Maecker, Dusseldorf, Germany Filed Mar. 27, 1956, Ser. No. 574,316

Claims priority, application Germany Mar. 28, 1955

12 Claims. (Cl. 90—15.1)

The present invention relates to an automatic electric control arrangement for machine tools, and more particularly to an automatic electric control arrangement for a crank shaft milling machine.

The crank shaft milling machines according to the known art are capable of making crank shafts of a single predetermined type. For instance, the machine is either designed for milling a crank shaft having four crank shaft portions and adapted for use with a four piston engine, or, the machine is adapted for making six, or eight crank shaft portions, respectively. The same machine according to the known art cannot be used for making crank shafts having different numbers of crank shaft portions. Milling of crank shafts is employed instead of turning the crank shafts on a lathe, since the operation is faster and more economical.

It is one object of the present invention to overcome the disadvantages of the prior art, and to provide an automatic electric control arrangement for a crank shaft milling machine permitting the production of crank shafts having a selected number of crank shaft portions.

It is another object of the present invention to provide an automatic electric control arrangement for a crank shaft milling machine permitting the production of crank shafts having crank shaft portions of different axial lengths.

It is a further object of the present invention to provide an automatic electric control arrangement for a crank shaft milling machine for producing a crank shaft having crank portions inclined at selected angles with respect to each other.

Another object of the present invention is to provide an automatic electric control arrangement for shifting a tool carrying support in longitudinal direction corresponding to the spacing of crank shaft portions as well as for the purpose of milling crank shaft portions having a greater axial length than the axial extension of the milling tool.

Another object of the present invention is the provision of an automatic electric control arrangement capable of controlling axial shifting movements as well as transverse cutting movements of a milling tool in such manner that all necessary operations and motions are carried out in a predetermined selected sequence.

With these objects in view, the present invention mainly consists in an automatic electric control arrangement for a crank shaft milling machine, or for a similar machine tool, which comprises, in combination, electrical shifting means for shifting a tool between a plurality of positions spaced along a work piece; electrical operating means for moving the tool in each of said positions in a transverse direction; and automatic electrical means for actuating the electrical shifting means and the electrical operating means in a selected sequence.

In accordance with a preferred embodiment of the present invention, a tool carrying carriage supports control switches which are automatically actuated during movement of the carriage by cam bars arranged adjacent each other in two planes. One of the cam bars controls shifting movements for the purpose of placing the tool opposite spaced crank shaft portions. The other of the cam bars controls shifting movements for the purpose of shifting the tool for producing crank shaft portions which have an axial extension greater than the axial extension of the tool. An electromagnetic switching mechanism is associated with the control switches and with the cam bars, and has as many positions as there are cam bars provided. The electromagnetic switching mechanism selectively renders the cam bars effective.

The transverse motions of the tool are controlled by a stepping mechanism, which is associated with selecting switches and terminal switches for the purpose of selecting the number of crank shaft portions to be milled, selecting the angular positions of the crank portions, and selecting the axial extensions of the crank shaft portions. Groups of selecting and terminal switches are provided in such manner that it is possible to select the required transverse motions of the tools for any position of the stepping mechanism, while the machine returns to its initial position whenever set to automatic operation, even if the machine was previously stopped or manually adjusted. During the operation of the machine, the crank shaft is rotated by a motor, and milled by a rotary milling tool. The rotation of the crank shaft produces the feed movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagram illustrating the electrical connections required for producing the axial shifting movement of a milling tool controlled by the automatic control arrangement according to the present invention. Fig. 1 includes the separated Figs. 1a, 1b, and 1c Fig. 1b illustrating two positions of the electromagnetic switching mechanism, and Fig. 1c illustrating the elements required for adjusting the rotary speed of the machine;

Figs. 2 and 3 are the upper and lower portions of a single diagram illustrating the electrical connections required for controlling transverse motions of the tool. Fig. 2 includes the separated Figs. 2a, 2b and 2c. Fig. 3 includes the separated Figs. 3a, 3b and 3c;

Fig. 2a illustrates the arrangement for checking the angular position of the respective next following crank shaft portion;

Fig. 2b illustrates the connections required for termination of a dividing operation, that is the operation during which the tool is shifted in transverse direction from one crank shaft portion to the next following crank shaft portion if the same is angularly displaced with respect to the preceding crank shaft portion;

Fig. 2c illustrates the connections and elements required for switching the machine to a lower rotary speed;

Figure 1A:
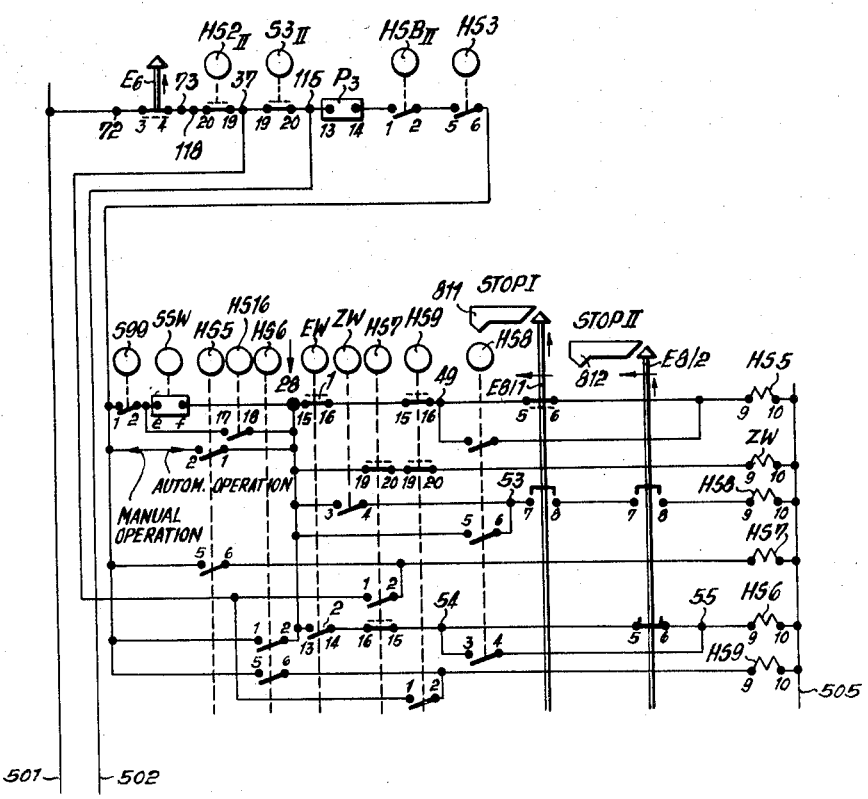
Figure 5:
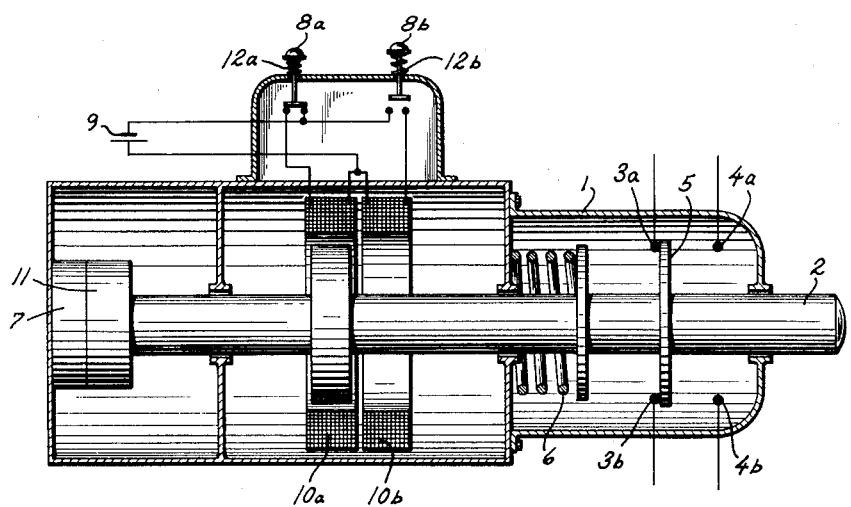

Fig. 3a, which is a continuation of Fig. 2c, illustrates the electrical connections for a repeated transverse cutting operation;

Fig. 3b illustrates the electrical connections and elements required for selecting the number of crank shaft portions which are to be milled; and Fig. 3c illustrates the electrical connections and elements required for switching the motor of the stepping mechanism to a lower rotary speed, the reference numerals 501 to 507 indicating corresponding lines in the separated figures;

Fig. 4 is an isometric view illustrating a crank shaft milling machine provided with the control arrangement of the present invention;

Fig. 4a is a fragmentary isometric view of a detail of the arrangement illustrated in Fig. 4;

Fig. 4b is a fragmentary isometric view illustrating another detail of the arrangement illustrated in Fig. 4;

Fig. 4c is a fragmentary isometric view illustrating another detail of the machine illustrated in Fig. 4; and Fig. 5 is a longitudinal sectional view of an electromagnetic switching mechanism applied in a preferred embodiment of the present invention.

Referring now to the drawings, and more particularly to Fig. 4, on a machine bed A is arranged a spindle stock B carrying a chuck D. At the other end of the machine bed A is arranged a tail stock C. A crank shaft F is arranged between the chuck D and the tail stock C, and is supported intermediate its end by additional supports C'. A cam drum R is connected to the crank shaft F for rotation therewith. The cam drum R, and switches E10/1–8 are shown in Fig. 4b on an enlarged scale. A carriage $G_2$ is mounted on the machine bed A for movement in axial direction of the crank shaft F. A tool support $G_1$ is mounted on the carriage $G_2$ for transverse movement. A milling tool disk L is mounted on the support $G_1$. A motor $M_3$ controls the axial movement of the carriage $G_2$, and a motor $M_2$ controls the transverse movement of the support $G_1$. The motor $M_1$ drives the chuck D which turns the crank shaft F. The carriage $G_2$ supports terminal control switches E8/1, E8/2 and E8/3 which are actuated during movement of the carriage $G_2$ by a pair of parallel cam bars I and II, which are shown on an enlarged scale in Fig. 4a.

Adjacent the spindle stock B is arranged a casing Q having a control panel. A selecting switch $P_3$ having eight operative positions is mounted on the panel. Indicating lamps $L_1$ and $L_2$ are also provided on the panel for indicating whether the machine is in the position for shifting the carriage $G_2$ between consecutive crank shaft portions, or is in a position for shifting the carriage $G_2$ for short distance for the purpose of milling a crank shaft portion having an axial length greater than the axial extension of the milling tool L. Push buttons D (EW) are provided for operating the electromagnetic switching mechanism as will be described in greater detail hereinafter. The casing Q is about six feet high, so that the manually controlled elements arranged in the upper portion of the control panel can be easily operated by an operator. Fig. 4 is substantially drawn to scale so that the great size of the machine will be appreciated.

Fig. 4a also shows a switch E8/3 by which the return movement of the carriage $G_2$ is controlled. The function of the elements shown in Figs. 4, 4a and 4b will be described in greater detail hereinafter with reference to the circuit diagrams illustrated in Figs. 1, 2 and 3.

The transverse feed movements of the tool L are derived from a template disk, not shown in the drawings, which controls the transverse movement of the support $G_1$ under the action of the motor $M_2$. The template disk is connected to a cam disk T shown in Fig. 4c. Cam disk T controls two switches E5 and E4. The terminal switches E5 is provided for disconnecting the drive of the crank shaft F tand the drive of the transverse copying movement of the support $G_1$. The lower terminal switch E4 is provided for controlling the rotary speed of the motors through regulating devices located in casing Q. This arrangement is known, and not an object of the present invention.

Figure 1B:
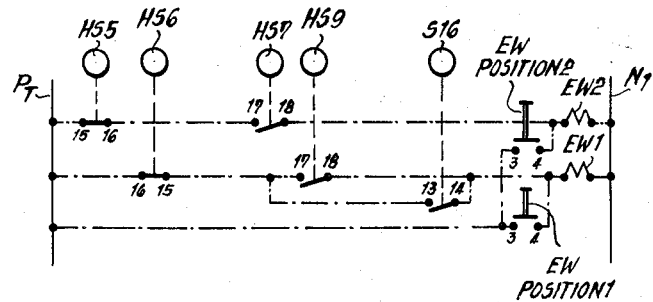
Figure 1C:
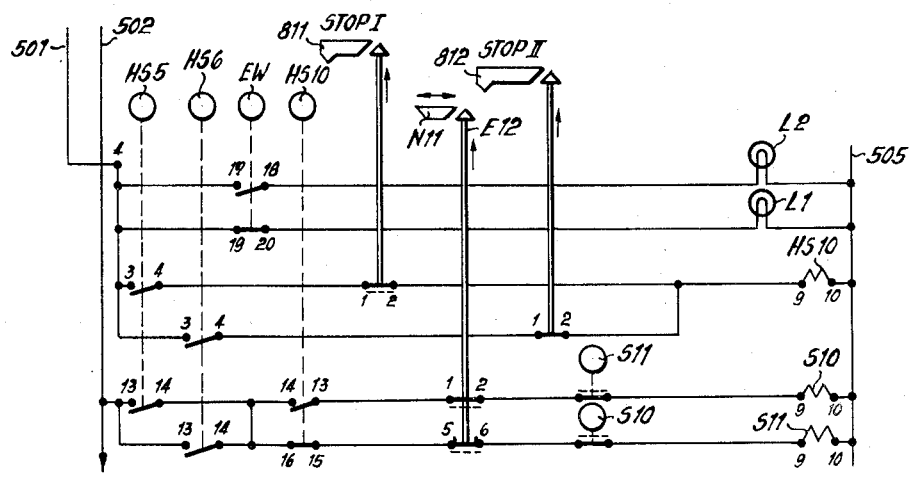

Fig. 1 illustrates the arrangement for the automatic control of the shifting of the carriage $G_2$. A switch E6 controls contacts 3, 4 for starting an axial shifting operation. The terminal control switches E8/1 and E8/2 are illustrated on the right side of Fig. 1. The switches E8/1 and E8/2 are shown to cooperate with stops 8/1 and 8/2 which are provided on the cam bars I and II described with reference to Figs. 4 and 4a. As shown in Fig. 1, a stepping mechanism SSW, the electromagnetic switching mechanism EW having two positions indicated by numerals 1 and 2, a selecting switch $P_3$ associated with the stepping mechanism SSW, a number of electromagnetic relays S, and auxiliary relays HS, and the timing mechanism ZW are the elements which control the axial shifting of the milling tool. Stepping mechanism SSW is located in casing Q which is shown in Fig. 4.

In addition to the shifting of the milling tool from one crank shaft to the next following crank shaft portion, it is necessary to shift the milling tool for a very short distance for the purpose of milling crank shaft portions having an axial length greater than the axial extension of the milling tool. This requires a single transverse cutting motion, or several consecutive transverse cutting motions of the tool, with a short axial movement of the tool between two consecutive transverse cutting motions. The axial shifting between two cutting positions requires only a shifting for a very short distance, which may be a few millimeters, however, in certain cases an axial shifting of a few hundredths or tenths millimeter may be required. If the carriage $G_2$ has been positioned for the first cutting operation by a stop on a cam bar, such stop must be released before the carriage $G_2$ is set in motion to assume the axially displaced position for the next cutting operation on the same crank shaft portion. The difficulty arises that any stop, regardless of whether a mechanical or electrical stop is concerned, necessitates a distance of at least a few millimeters from the beginning of the actuation to the complete release. The stop of an electrical contact must have a certain mechanical strength, and must be adjustable, as well as be protected from soiling and moisture. These requirements necessitate a minimum mechanical size of the stop.

In accordance with the present invention, a plurality of electrical stops cooperate with at least two terminal control switches which are arranged in different planes. Each control switch cooperates with a cam bar, as described with reference to Fig. 4c, and only one of the cam bars must be operative with one of the control switches. In order to render different stops selectively effective, an electromagnetic switching mechanism is provided which has as many positions as there are cam bars having stops for actuating the control switches. In the illustrated embodiment, only two cam bars I and II are provided.

An electric switching mechanism which is used in the arrangement of the present invention is illustrated in Fig. 5. A shaft 2 carries a contact bridge 5 which cooperates with two pairs of contacts 3a, 3b and 4a, 4b. A spring 6 abuts against a transverse wall of the housing 1 and against a flange on the shaft 2 and urges the shaft 2 to move to the right in Fig. 5 into a position in which the contact bridge 5 connects the contacts 4a and 4b. In the position illustrated in Fig. 5, a permanent magnet 7 which is fixed to the housing 1 holds the armature portion 11 of the shaft 2, so that the shaft is held in the illustrated position against action of spring 6. The shaft 2 is moved from its right hand position to its left hand position by operation of the button 8a which closes a contact in a circuit including a source of current 9 and the electromagnet 10a. The electromagnet 10a moves the shaft 2 to the left and into the illustrated position in which the permanent magnet 7 holds the shaft 2. When in the illustrated position, the button 8a is released, and the contact operated by the button 8a is opened by the spring 12a the circuit 9, 10a is interrupted, but the shaft is held by the permanent magnet 7 in the illustrated position in which the contacts 3a and 3b are connected. When it is desired to move the shaft 2 to the right for closing the contacts 4a, 4b, the button 8b is operated which closes a circuit including the source of current 9 and the electromagnet 10b. Electromagnet 10b has a winding which is wound in a direction opposite to the winding of the electromagnet 10a, and consequently effects a separation of the armature flange 11 from the permanent magnet 7. When the button 8b is released, its spring 12b returns it to its inoperative position. It will be understood, that the electromagnet 10a must have such force as to overcome the resilient force of the spring 6, whereas the electromagnet 10b must have such force as to overcome the magnetic force of the permanent magnet 7. The push buttons 8a and 8b are designated by the reference numeral D (EW) in Fig. 4.

The contacts used in an electromagnetic switching mechanism of this type permit an exact stopping at a distance of plus or minus one hundredth of a millimeter so that distances for repeated cutting operations become possible which are up to 0.02 mm. The mechanical construction of the stops and of the switch actuating member cooperating with the stops may be chosen as desired since whenever a stop is engaged, the preceding stop is made ineffective. The electromagnetic switching mechanism switches automatically in order to render ineffective the respective terminal control switch which was effective during the preceding operation, and to transfer the control to the next following stop cooperating with the next following terminal control switch. Such automatic operation of the electromagnetic switching mechanism is carried out directly after an axial shifting operation has been terminated. Thereupon, the other stop is rendered effective with the other terminal control switch, as if only such other terminal control switch would have to terminate both axial shifting movements. In the embodiment illustrated in the drawing, no more than two axial shifting movements are assumed to be necessary for milling a single crank shaft portion. In the event that a third axial shifting would be required for completing the milling of a single crank shaft portion, a third, and if necessary a fourth and fifth stop would have to be provided. A third stop would have to cooperate with the first control switch so that the adjustment of the third stop is independent of the adjustment of the second stop. A first, third, fifth and all odd numbered stops will have to cooperate with a first terminal control switch, and a second, fourth, and all even numbered stops will have to cooperate with its second control switch. All odd numbered stops are arranged in one plane and on one cam bar, and all even numbered stops are located in another plane and on another control cam bar so that the stops do not touch each other. In the event that it is necessary to shift the tool a third time in axial direction for completing the cutting of a single crank shaft portion, and in the event that such distance is different from the distance obtained by the control switch E8/2 cooperating with the cam bar II, it would be necessary to provide a third cam bar.

The control operations required for axial shifting will now be described with reference to Fig. 1.

The cam bars or stop bars I and II are respectively associated with terminal control switches E8/1 and E8/2. Each of the control switches has pairs of contacts 5—6, 7—8, and 1—2. The top portion 1a of Fig. 1 illustrates the connections for two transverse cutting motions of the milling tool required for producing a single crank shaft portion. The end switch E6, shown on the left of Fig. 1, closes when the first transverse cutting motion has been terminated and when the support $G_1$ performs its return movement so that the milling tool is located outside of the crank shaft. The carriage $G_2$ is now free to perform a movement in axial direction of the crank shaft without interference between the milling tool and the work piece. The signal for shifting is given by the switch E6. The selecting switch $P_3$ controlling contacts 13 and 14 is the switch which is associated with the number of crank shaft portions to be milled, and consequently determines the selection of the number of operational positions of the stepping mechanism SSW. In the illustrated example, it is assumed that eight crank shaft portions are to be milled, and consequently, the stepping mechanism SSW has eight operational positions. The stepping mechanism SSW has locking contacts e—f. These contacts transfer the actuating signal only in the operational positions 1 to 7 of the stepping mechanism, since in the eighth position no further axial shifting movement of the tool is required if only eight crank shaft portions have to be milled. In this position only a return motion of the carriage $G_2$ is necessary. The contacts 13—14 of the selecting switch $P_3$ are closed in the positions 2–8. The actuating signal is conducted from the point 28 indicated by a heavy dot and by an arrow to the respective auxiliary relays associated with the cam bars I and II.

The two terminal control switches E8/1 and 2 respectively control three pairs of contacts 1—2, 5—6, and 7—8. As previously described, the control switch E8/1 is associated with a stop bar I and the control switch E8/2 is associated with a stop bar II. The two stop bars I and II serve for respectively controlling a long distance shifting between two consecutive cam shaft portions and a short distance shifting required for repeated milling operations on a single cam shaft portion. The relays and auxiliary relays are illustrated on the right side of Fig. 1. The control relay for stop bar I is indicated by the reference numeral HS5, and the control relay for the stop bar II is indicated by the reference numeral HS6.

The center portion 1b of Fig. 1 illustrates the two possible positions of the electromagnetic switching mechanism indicated by EW1 and EW2. The electric switching mechanism which has been described with reference to Fig. 5 has two positions which are automatically shifted. The electromagnetic switching mechanism EW is provided for the purpose of shifting the control switches E8/1 and E8/2 for operation with the two cam bars I and II in an automatic operation. For instance, if the electromagnetic switching mechanism EW has just shifted the carriage $G_2$ a long distance to the next following crank shaft portion, it is automatically shifted to its other position if the respective crank shaft portion requires two milling operations so that the milling tool is shifted a short distance. Such longitudinal shifting is, of course, carried out in addition to the transverse feeding motions of the tool.

The bottom portion 1c of Fig. 1 shows the auxiliary relay HS10 which controls the adjustment of the rotary speed. The relay S10 is provided for producing the rotary speed 3,000, and the relay S11 is associated with the rotary speed 500.

The signal given by the switch E6 passes through several locking contacts which check whether the turning movement of the work piece has been terminated, see HS2, and whether the advancing feed movement has been stopped, and pass through the locking contact 13—14 of the selecting switch $P_3$ which determines whether a shifting operation is necessary. The signal then passes through the contacts HSB and HS3, which are only connected when automatic shifting is required, and through the contacts 1—2 of the return relay S99, which is only closed when a return movement is to be started, that is after at least one transverse motion of the milling tool in forward direction.

The signal having passed through the locking contacts e—f of the stepping mechanism arrives at point 28 and passes from there to the auxiliary relay HS5 which is associated with the cam and stop bar I. This command signal is consequently associated with the position 1 of the electromagnetic switching mechanism.

In the event that the electromagnetic switching mechanism is in position 2, the contacts 13—14 of the electromagnetic switching mechanism are closed and the command signal passes from point 28 to auxiliary relay HS6 associated with the second cam bar II.

When the electromagnetc switching mechanism is in position 1, the relay HS5 has attracted and is held in its shifting position by holding circuit including the contacts 2—1. The relay HS5 automatically energizes the relay HS7 through the contacts 5—6. Relay HS7 prepares the switching over to stop bar II. The auxiliary relay HS10 which produces a rotary speed of 3,000 revolutions, is energized through contacts 3—4 of relay HS5, and the contacts 1—2 of the control switch E8/1 unless the same are already interrupted, see portion 1c of Fig. 1.

The relay S10 is now energized through contacts 13—14 of relay HS5 and through contacts 13—14 of relay HS10. The carriage $G_2$ moves now to the left in Fig. 1 and takes along the terminal control switch E8/1, as will be understood considering the illustration of Fig. 4.

After the required axial shifting movement has been terminated, the terminal control switch E8/1 engages the stop I. The stop I operates the switch E8/1 only through half its possible stroke so that at first only the contact 1—2 is opened. The rely HS10 drops off, and disconnects through contacts 13—14 the relay HS10 producing a number of revolutions of 3,000, and energizes through contacts 15—16 the relay S11 which produces a rotary speed of 500 revolutions. The stops which actuate the switches E8/1 and E8/2 have different heights for the purpose of shifting the machine to a lower rotary speed at the end of the operation. The motor is immediately reduced to a speed of 500 revolutions per minute since it has two separate windings, and the carriage $G_2$ moves at ⅙ of its former speed in axial direction until the contacts 5—6 open, which corresponds to the full stroke of the terminal control switch, whereby the relay HS5 is disconnected.

Due to the inactivation of the relay HS5, the relay S11, which is associated with the motor, is disconnected and the motor stops. In order to produce immediate stopping of the motor, a magnetic coupling is simultaneously disconnected so that the inertia of the motor has no influence on the immediate stopping of the carriage.

Due to the dropping off of the relay HS5, its contacts 15—16 close. Through the contacts of the relay HS7, which was previously connected, the winding 2 of the electromagnetic switching mechanism is actuated so that the same moves to position 2. Thereby, the terminal control switch E8/1 is rendered ineffective. The closing of the contacts 13—14 of the stepping mechanism in position 2 has at first no effect, since the relay HS7 is still connected. Consequently, the command signal is not transferred through the contacts 15—16 to the terminal control switch E8/2. Only after the switch E6 is released and clears the previous command signal, that is after the next transverse milling operation starts, the auxiliary relay HS7 drops off.

It will be understood from the preceding description, that the relays HS7 and HS9 prepare and preset the shifting over from one stop bar to the other stop bar. In the event that during the next following return movement of the carriage $G_2$, the same again actuates the switch E6, in other words the new command signal for a shifting operation is given, the point 28 would be again connected to the voltage, through the electromagnetic switching mechanism and the contacts 13—14 thereof, through relay HS7 and the contacts 16—15 thereof, through terminal control switch E8/2 and its contacts 5—6, and auxiliary relay HS6 is energized and attracts. Relay HS6 is held in attracted position by the holding circuit closed by contacts 1—2, and connects through contacts 5—6 the auxiliary relay HS9 which presets in the same manner as described with reference to the relay HS7, the shifting of the electromagnetic switching mechanism from position 2 to position 1. The auxiliary relay HS10 is connected through the contacts 3—4 of the auxiliary relay HS6 and through the contacts 1—2 of the control switch E8/2. When the left projecting stop 2 becomes operative, the relay S10 for the rotary speed of 3,000 revolutions is disconnected through the contacts 13—14 of the auxiliary switch HS6 and through relay HS10 after the relay HS10 has dropped off, and then the relay S11 associated with the rotary speed of 500 revolutions is connected. When the more projecting stop becomes operative and engages the corresponding switch member the auxiliary relay HS6 is disconnected through the terminal control switch E8/2 and contacts 5—6 whereby the shifting movement in axial direction is terminated. Only after the command signal has been terminated, the relay HS9 drops off, whereby the electromagnetic switching mechanism is returned to position 1 through the relay HS9 and contacts 17—18.

From the above explanation, it will be understood that the two stop bars I and II, or a greater number of stop bars if such greater number is provided, are equivalent so that a symmetric circuit can be provided. In the illustrated embodiment, two stop bars I and II are provided, and it is immaterial whether the mechanism is shifted from stop bar I to stop bar II or in opposite manner from stop bar II to stop bar I.

The locking is still present, so that, if the distance between the two operative stops is very short, the control switch E8/2 would be operated with half a stroke of its movable member if the control switch E8/1 has disconnected. In the event that the relay HS6 connects in this position, the contacts 1—2 of the control switch E8/2 would be interrupted. The relay HS10 is not actuated, and the shifting movement starts already with the relay S11, in other words at a lower number of revolutions 500. Due to the fact that the shifting distance is only a few millimeters, it is of course only possible to operate at the lowest shifting speed.

If the terminal control switch E8/2 opens the contacts 5—6 already after a few millimeters, the condition may arise that the contacts 5—6 are not yet closed by the switch E8/1, in other words, the control switch E8/1 would not yet have been released by the associated stop. In this event, both stop bars would be inoperative, and no shifting movement could take place. According to the present invention, the contacts 5—6 and 7—8 are so positioned that they overlap. Thereby, it is assured that the contacts 7—8 are closed in both terminal control switches E8/1 and E8/2 before the contacts 5—6 open. When the command signal passes through point 28 under such circumstances, the winding of the timing mechanism ZW would be energized, since the contacts 19—20 of the relay HS7 and the contacts 19—20 of the relay HS9 are closed. Relays HS7 and HS9 cannot attract, since the relays HS5 and HS6 cannot attract either. The timing mechanism is adapted to a time period sufficient for checking whether one of the two auxiliary relays HS5 or HS6 has been actuated. After such time period has elapsed, the contact pair 3—4 of the timing mechanism ZW closes and connects the auxiliary relay HS8 through contacts 7—8 of the two control switches E8/1 and E8/2. The relay HS8 is held by holding circuits and bridges with its contacts 1—2 and 3—4 the interrupted contacts 5—6 of the control switches E8/1 and E8/2. In accordance with the position of the electromagnetic switching mechanism, the relays HS5 or HS6 attract, and the next axial shifting operation can be started. In the moment, in which one of the two switches E8/1 or E8/2 are released by the stop I or II, respectively, the contacts 7—8 open. Thereby, the auxiliary relay HS8 drops off, and the bridging of the contacts 5—6 is terminated.

In the event that during the setting of the machine a corresponding stop bar was selected, the electromagnetic switching mechanism may be manually shifted by operation of the push buttons described with reference to Figs. 4 and 5. The signal lamps $L_1$ and $L_2$, described with reference to Fig. 4, are also shown in portion 1c of Fig. 1.

During the return movement of the carriage $G_2$, the winding 1 of the electromagnetic switching mechanism is energized through the contacts 13—14 of the relay S16 so that the electromagnetic switching mechanism is always in position 1 when the machine is in initial position. At the beginning of the automatic operation of the machine, the stop bar I and the terminal control switch E8/1 is effective.

Control of the milling operations

As previously described, a stepping mechanism is provided for controlling the milling operations of the crank shaft portions. The stepping mechanism has as many positions as there are crank shaft portions which have to be milled. In the illustrated example, it is assumed that the machine has to mill eight crank shaft portions in successive operations, and consequently the stepping mechanism has eight operative positions. In accordance with the present invention, the stepping mechanism controls in each of its operational positions a number of transverse movements of the milling tool. In each of its positions, the stepping mechanism determines what operation has to be carried out at any given moment. For instance, the stepping mechanism determines whether after the milling of a crank shaft portion, the tool is to be shifted to the next following crank shaft portion, or whether an indexing operation is required, or whether it is necessary to carry out a second milling operation on the same crank portion before the machine is shifted to the next following crank shaft portion.

Figs. 2 and 3 illustrate the electrical connections and circuits required for automatic control of the transverse movement of the milling tool, which according to the present invention are possible in every position of the stepping mechanism.

Corresponding to Fig. 1, the end switch E6 is shown in the left hand upper corner of Fig. 2, such end switch E6 producing the command signal for axial shifting as previously described. Adjacent thereto the same relays and contacts are shown as in Fig. 1 up to the return relay S99. From there on, the command signal passes to point 92 which is indicated in Fig. 2 by an arrow and a heavy dot.

Adjacent point 92, the stepping mechanism SSW is illustrated the eight positions of the stepping mechanism are indicated by the numerals 1–8.

Selection of the number of crank shaft portions

The milling of the crank shaft portions is controlled by the selecting switch $P_3$ which has eight positions. Due to the alternating operation of the selecting switch $P_3$ and of the stepping mechanism SSW, the result is obtained that the stepping mechanism moves from the respective last position always to the position 8. The position 8 of the stepping mechanism is the last position which can be assumed, since the machine has to operate only 8 crank shaft portions. In the event that, for instance, four crank shaft portions are to be milled, instead of eight, the carriage moves automatically from the fourth position to the eighth position. If only two crank shaft portions are to be milled, the carriage would automatically move from position 2 to position 8 since the two crank shaft portions are milled in positions 1 and 2.

The setting of the selecting switch $P_3$ to the eight different positions is illustrated in portion $3b$ of Fig. 3. The positions 1–8 are schematically indicated on the circle adjacent the selecting switch $P_3$.

It is assumed that a crank shaft for a four cylinder engine is to be milled. Consequently, the machine must select four crank shaft portions. The selecting switch $P_3$ is set to position 4. In this position, the selecting switch $P_3$ closes its contacts 5—6 whereby its terminal 6 is connected with the terminal 56 of the stepping mechanism SSW as shown in portion $3b$ of Fig. 3. When the stepping mechanism has finished the third crank shaft portion, it shifts to operational position 4. In this position, the terminal 49 is connected through terminal 25 to terminal 56 of the stepping mechanism which is thus connected to voltage. The motor of the stepping mechanism is now connected to voltage through the terminal 6—5 of the selecting switch $P_3$, and such connection is effected through relay S14 which is associated with the motor. The stepping mechanism is actuated and runs continuously into position 8, since in this position the contacts 55—56 are interrupted. In this position, the contacts $e$—$f$ of the stepping mechanism are opened, and consequently the command signal for axial shifting is interrupted. In the description of Fig. 1 it was stated that the contacts $e$—$f$ of the stepping mechanism transfer the command signal for axial shifting to the connecting point 28 only in the positions 1–7 of the stepping mechanism. In the position 8, the contact $e$—$f$ is interrupted. The stepping mechanism must come to a standstill until the fourth crank shaft portion has been milled completely.

Return of the support to initial position

When the milling of the fourth crank shaft portion is terminated, the command signal for dividing or shifting of the electromagnetic shifting mechanism is given through return relay S99 in accordance with the position of the auxiliary relay HS11. In the event that a command for dividing is given, the stepping mechanism runs to its initial position only after the dividing operation has been completed. In such initial position, the stepping mechanism interrupts the contacts $a$—$b$ for the automatic command signal for a transverse milling operation as described with reference to portion $3a$ of Fig. 3, and gives through contacts $c$—$d$ a command signal to the points 47 and to relay S15, respectively, for returning the support at a speed of 3,000 revolutions, see portion $3c$ of Fig. 3. At the end of the return movement, the relay S15 associated with the rotary speed of 3,000 revolutions is disconnected through the terminal control switch E8/3, and the relay S16 is connected through the auxiliary relay HS15 for the rotary speed 500 revolutions per minute. The terminal control switch E8/3 has a movable engaging member which can move to different strokes. The shifting for the rotary speed 500 is carried out by depressing the less projecting member. If the control switch E8/3 is completely depressed, the relay S16 is disconnected resulting in disconnection of the electromagnetic coupling of the drive producing the axial shifting of the tool, so that the carriage $G_2$ stops.

In the event that instead of a crank shaft for a four cylinder engine, a crank shaft having six crank shaft portions is to be milled, the selecting switch $P_3$ is shifted to position 6. In this position of the selecting switch $P_3$, a connection with the terminal 60 of the stepping mechanism is produced through terminal 10, so that in position 6 of the stepping mechanism a direct command signal is given to the motor of the stepping mechanism for moving the carriage from the position associated with the sixth crank shaft portion directly to the eighth position. The stepping mechanism will always run to its eighth position from any other position to 27 after the last crank shaft portion has been milled. In position 8, the return movement is preset and prepared as has been described previously with reference to a crank shaft having four crank shaft portions for a four cylinder engine. The stepping mechanism with the associated selecting switch $P_3$ and the respective auxiliary relays is so designed that it continues its turning movement while the respective milling operation is still being carcarried out. In known control arrangements, the stepping mechanism would stop in the last position 4, or 6 respectively, consequently, in each position of the stepping mechanism in which the last crank shaft portion is milled, means for giving a command signal for return movement would have to be arranged, and rendered ineffective by the selecting switch. According to the present invention, a control arrangement sufficient for eight cam shaft portions is arranged in such manner that the eighth position is always the last regardless to which number of crank shaft portions the control arrangement is preset. Thereby, the control arrangement according to the present invention is simple, and reliable.

Indexing

In accordance with the above defined arrangement, the stepping mechanism would receive a command signal for operation on the next following crank shaft portion after a milling operation has been terminated at a crank shaft portion.

However, it is possible that the angular position of the next following crank shaft portion is different from the angular position of the previously milled crank shaft portion. The stepping mechanism according to the present invention must check in each of its positions whether the tool has to be directly shifted to the next position, or whether indexing is necessary. Direct axial shifting is necessary when two consecutive crank portions have the same angular position, whereas indexing is necessary when two consecutive crank shaft portions are angularly displaced. The term "indexing" is used to denote a transverse shifting from a position in which the tool is associated with one crank portion to a position in which the tool is associated with another angularly displaced crank portion of the crank shaft.

In accordance with the present invention, the stepping mechanism is associated with a group of terminal control switches E10/1 to E10/8, which are shown in Fig. 2 in the right hand upper corner. The switches E10 are operated by stops or lugs R1 to R8 provided on a cam drum R shown in Fig. 4b. The Roman numerals above the Arabic numerals 1-8 in Fig. 2 indicate the switch positions. The positions of the switches E10/1 to E10/8 and the parts of the stepping mechanism associated therewith determine whether the next following crank shaft portion has the same angular position as the preceding crank shaft portion so that axial shifting can take place, or whether the next following crank shaft portion is angularly displaced requiring indexing operation. In the event that the angular position of the next following crank portion is the same as the angular position of the preceding crank portion, and only the second next crank shaft portion has a different angular position, such checking is carried out after the next following crank shaft portion has been milled, and when the respective transverse tool motion has been completed.

In the event that the next following crank shaft portion has a different angular position, the contact to the switch E10 associated with the respective crank shaft portion is closed, and the command signal "indexing" is passed on to the motor $M_1$ which turns the work piece. The spindle rotating the crank shaft turns until the next following switch E10 has been opened. In the meantime, the next following crank portion has assumed the required operational position for a milling operation. Only after such indexing operation has been terminated, the stepping mechanism receives the command signal causing it to assume its next following position. The shifting of the stepping mechanism is consequently a preparatory measure, since after each dividing operation or after the shifting of the stepping mechanism, first the next transverse milling operation has to take place. The command signal for the next following crank shaft portion is always given through the switch E6 described with reference to Fig. 1. The command signal passes through the automatic controls and through the relays HSB, HS3, return relay S99 to point 28 and also to point 92 shown in Fig. 2a. The command signal passes from terminal 92 to terminal 1 of the stepping mechanism and in position 1 of the stepping mechanism directly to terminal 2.

From terminal 2 the signal passes to terminal 1 of the switch E10/2.

It is assumed that the stepping mechanism is in position 1, and that the first crank shaft portion has just been milled. In the event that the next following crank shaft portion is in a different angular position than the first crank shaft portion, the contacts 1—2 of the switch E10/2 are closed. The signal is conducted from terminal 92 through terminal switch E10/2 to the auxiliary switch HS11, passing through all other terminal switches and through the bridging means of the electromagnetic switching mechanism SSW to the switch E10/8. The auxiliary relay HS11 attracts, and the relay S12 connects so that the drive spindle of the crank shaft is separated from the feeding motion. The positive coupling between feed motions and rotation of the work piece must be interrupted at this time. As soon as the electromagnetic relay S12 which is associated with the coupling means K3 is connected, the relay S6 is connected through the contacts 13—14 of the relay S12 and through the terminal switch E9, shown in the left hand portion of Fig. 2. Switch E9 is associated with the coupling K3 shown in portion 2a of Fig. 2 above the switch E9, and checks whether the coupling K3 is actually connected. The relay S6 effects start of the motor $M_1$ which rotates the work piece. The relay S6 is held in operative position through a holding circuit including the contacts 13—14, the terminals 19—20, and the contacts 5—6 of the terminal switch E10/2. The connection required for actuating the relay S6 is interrupted by the auxiliary relay HS12 which is controlled by the relay S6. The auxiliary relay HS12 remains in this position until the command signal is terminated.

At the same time, the terminal 111 shown in portion 2b of Fig. 2 and indicated by a heavy dot and by an arrow, receives the voltage signal, and consequently the relay S13 associated with the starting speed receives the signal when the contacts 7—8 of the terminal switch E10/2 close. The still closed contacts 7—8 of the terminal switch E10/1 are ineffective during the start of the motor, since the relay S13 is connected to voltage only when the timing mechanism ZW4 releases. Consequently, the timing mechanism ZW4 renders the slow starting speed ineffective until the terminal switch is freed at the beginning of the dividing operation. The operation always starts at full speed, which results in a considerable saving of time.

The relay S13 which is connected to voltage through terminal 111, controls the resistances of the excited windings of the generator, and at the same time controls electromagnetic coupling means so that the rotary speed in operative condition is $\frac{1}{24}$ smaller in relation to the normal rotary speed. Consequently, the tool moves very slowly to the desired angular position permitting the desired high accuracy.

In order to even increase such exactness, the motor is braked in a known manner by short circuiting its rotor. In this event, the stepping mechanism will receive the command signal only after the indexing operation has been completed.

No indexing required

In the event that the next following crank shaft portion, or one of the next following crank shaft portions, has the same angular position as the first crank shaft portion, the connection to the voltage would be interrupted at this point as shown in Fig. 2a. Assuming, that the lugs would be in the same position in positions 2 and 6 as in position 1, the terminal control switches E10/2 and E10/6, contacts 1—2 would be interrupted. In this position the sixth crank shaft portion is not yet considered. The voltage from terminal 2 of terminal control switch E10/5 is connected to terminals 10 and 11 of the stepping mechanism through terminal 97. From there a connection exists to terminal 12, and through terminal 98 back to the terminal 2 of the terminal control switch E10/6. Consequently, the stationary contacts of the stepping mechanism render all control switches of the group E10/1 to E10/8 ineffective except the next following which has to be checked. The contact 1—2 of the terminal control switch E10/2 is also interrupted. In position 1, the terminal switch E10/2 is not bridged so that the connection to relay HS11 is interrupted in this case. The auxiliary relay HS11 does not attract. The relay S12 cannot connect, and the same is true with reference to relay S6. The command signal passes through terminal 467 through the dropped off contacts 15—16 of the auxiliary relay HS11 to the timing mechanism ZW5 as shown in portion 3b of Fig. 3. The motor of the stepping mechanism is connected through the relay S14, and the stepping mechanism moves to its next following position.

*Repeated milling operations on the same crank shaft portion*

It would be uneconomical to use different milling tools for different crank shaft portions of different lengths. In the event that the axial length of a crank shaft portion which is to be milled, exceeds the axial extension of the milling tool, the respective crank shaft portion is milled in such a manner that two transverse movements of the milling tool are carried out.

Between such two transverse motions, a short distance axial shifting must be carried out. For controlling repeated milling operation on a single crank shaft portion with intermediate axial shifting, according to the present invention the selecting switch P₃, which serves for selecting the number of crank shaft portions, is provided with additional selecting switches N1–N8 for each of its positions. In the positions of the stepping mechanism in which the milling operations have to be repeated, the last mentioned selecting switches N1–N8 control a locking relay HS16 which prevents dividing, as well as normal shifting of the stepping mechanism. The selecting switches N1–N8 also effect that after each axial shifting, a further command signal for a transverse motion of the milling tool is given. The eight selecting switches N1–N8 correspond to the respective stationary contacts of the selecting switch P₃ for the number of lugs and to the respective stationary contacts of the stepping mechanism.

From the above explanation it will be understood that a locking relay is connected if another transverse milling operation is required. Such locking relay interrupts the command signal for dividing and shifting of the stepping mechanism. The axial shifting is not interrupted since a short distance axial, shifting is required between two repeated transverse milling operations on the same crank shaft portion.

After such short distance axial shifting has been terminated, an intermediate command signal is given through a further relay HS17 which initiates the second transverse milling operation.

During the second transverse milling operation, another relay HS18 disconnects the locking relay HS16, and prevents its connection until the stepping mechanism has given the command signal for dividing and axial shifting after the support has finished its return movement. The stepping mechanism is shifted to its next following position for operation on the next following crank shaft portion regardless of whether a dividing operation has been carried out, or no dividing was required. Thereby the locking relay which was last connected is again disconnected so that in the next following position, the auxiliary relay for the second transverse milling operation can connect if in this position a corresponding preselection for repeated transverse milling operation has been carried out by the selecting switches N1–N8.

The portion 3a of Fig. 3 illustrates the electrical connections for repeated transverse milling operations on the same crank shaft portion. On the left side the selecting switch P₃ with its contacts is shown. Adjacent thereto, the selecting switches N1–N8 for repeated transverse milling operations are illustrated.

It is assumed, that two milling operations are required at selecting switch N4. The current passes from the stepping mechanism, terminal 33, through terminal 40, through selecting switch P₃ whose contacts 21—22 are closed in position 4 through 4–8, through selecting switch N4 for repeated milling operations. The contacts 1—2 thereof are connected to the auxiliary relay HS16 when the stepping mechanism moves to position 4 thereof. The auxiliary relay HS16 attracts and is held by holding circuit completed by contacts 17—16. The auxiliary relay HS16 interrupts with its contacts 15—16 the command signal for dividing and actuation of the stepping switch mechanism SSW. Due to the connection of the auxiliary relay HS16, neither dividing nor axial shifting can take place. At the end of the return movement from the first milling operation, a short distance axial shifting takes place. Consequently the auxiliary relays HS 5 or auxiliary relay HS6 are connected which control the axial shifting operations.

The relay HS17 is connected to voltage through the contacts 14—13 of relay HS16 and through the contacts 17—18 of relays HS5 or HS6. Relay HS17 connects and produces through its contact 1—2 the command signal for the second transverse milling operation. During such second milling operation on the same crank shaft portion, the auxiliary relay HS2 for turning the work piece attracts and connects the auxiliary relay HS18 through contacts 13—14 thereof and through contacts 5—6 of relay HS17. The auxiliary relay HS18 closes through contacts 13—14 thereof a holding circut for itself and opens through its contacts 15—16 the connection at the auxiliary relay HS16. Auxiliary relay HS16 drops off, and closes thereby its contacts 15—16.

When after the second milling operation the same crank shaft portion at the end of the return movement of the tool support, the command signal is given through the return relay S99, the command signal can be transferred through relay HS11 to S12 or to the motor of the stepping mechanism. At the moment at which the stepping mechanism shifts, it interrupts the connection to the auxiliary relays HS17 and HS18 through the contacts 19—20 of the relay S14 which is associated with the motor of the stepping switch mechanism and controls the same. Consequently, at this moment the two auxiliary relays are disconnected. If another selecting switch of the switches N1–N8 is closed when the stepping mechanism arrives in its next position, the relay HS16 could attract again. The stationary contacts of the selecting switch P₃ have the purpose that only so many selecting switches N1–N8 are rendered effective as corresponds to the possible number of crank shaft portions. In the event that a crank shaft having four crank shaft portions is to be milled, the selecting switch P₃ would have to be in position 4, and the switches N5–N8 would have no effect in the event that they are operated due to an error.

In the event that the last milled crank shaft portion requires two or more milling operations due to the fact that its length is greater than the axial extension of the milling tool, a repeated axial short distance shifting is required during operation of the last crank shaft portion. As previously described, the contacts e—f are interrupted in the position 8 of the stepping mechanism. Such interruption must be bridged if a short distance axial shifting is required during operation on the last crank shaft portion. This is done by the auxiliary relay HS16 by its contacts 17—18 which bridge the contacts e—f shown in Fig. 1. The auxiliary relay HS16 must be repeatedly actuated.

In the event that more than two milling operations are required for a single crank shaft portion it would be necessary to provide corresponding positions for the selecting switches N1–N8 corresponding in number to the number of the required milling operations. When more than two milling operations are required for a single crank shaft portion, for each third or further milling operation the same crank shaft portion, a further auxiliary relay HS7 would have to be added. For each milling operation exceeding 2, another auxiliary relay would have to be added to the illustrated arrangement. Assuming, for instance, three milling operations required for a single crank shaft portion, two auxiliary relays HS17/1 and HS17/2 would have to be provided. In this event, the relay HS18 would have to attract only when all auxiliary relays HS17 have been actuated.

It will be understood that each of the elements described above, or two or more together, may also find a useful application in other types of automatic electric control arrangements for machine tools, differing from the types described above.

While the invention has been illustrated and described as embodied in an automatic electric control arrangement for a crank shaft milling machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch so that only one of said cam bars is effective at any time for controlling said first electric motor means to shift the carriage, the support, and the tool selected axial distances along the crank shaft; a stepping switch mechanism for controlling consecutive machining of the crank shaft portions by a rotary tool and having a number of positions corresponding to the maximum number of crank portions of the crank shaft; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

2. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; two stationary cam members located and extending in axial direction, one of said cam members having a first set of stops associated with one set of crank shaft portions, and the other of said cam bars having a second set of stops associated with another set of crank shaft portions; at least two control switches adapted to be secured to the carriage and respectively associated with said cam members and actuated by said first set of stops and by said second set of stops, respectively, each of said two control switches being operatively connected to said first electric motor means for controlling the same independently of the other control switch so that only one of said cam members is effective at any time for controlling said first electric motor means to shift the carriage, the support, and the tool selected axial distances along the crank shaft; a stepping switch mechanism for controlling consecutive machining of the crank shaft portions by a rotary tool and having a number of positions corresponding to the maximum number of crank portions of the crank shaft; and a plurality of selecting switches and terminal switches connected to said stepping switch mechanism and associated with said positions of the same, said selecting switches and terminal switches controlling said second motor means for producing selected transverse motions of said support.

3. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch; an electromagnetic switching mechanism having two operative positions and rendering in each of said positions one of said two control switches operative, said electromagnetic switching mechanism moving alternately between said positions so that only one of said cam bars is effective at any time for controlling said first electric motor means to shift the carriage, the support, and the tool selected axial distances along the crank shaft; a stepping switch mechanism for controlling consecutive machining of the crank shaft portions by a rotary tool and having a number of positions corresponding to the maximum number of crank portions of the crank shaft; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

4. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch to shift the carriage, the support, and the tool selected axial distances along the crank shaft; an electromagnetic switching mechanism having two operative positions and rendering in each of said positions one of said two control switches operative, said electromagnetic switching mechanism moving alternately between said positions so that only one of said cam bars is effective at any time for controlling said first electric motor means; an auxiliary relay and a relay means associated with each of said positions of said electromagnetic switching mechanism, the auxiliary relay associated with each of said positions producing a signal for presetting the switch over to the other position while the relay means associated with the respective position of the electromagnetic switching mechanism is still energized; a stepping switch mechanism for controlling consecutive machining of the crank shaft portions by a rotary tool and having a number of positions corresponding to the maximum number of crank portions of the crank shaft; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

5. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction, each of said cam bars having a set of stops, said stops of said sets of stops being of different height; at least two control switches adapted to be secured to the carriage and respectively associated with said cam bars and actuated by said stops, each of said two control switches being operatively connected to said first electric motor means for controlling the same independently of the other control switch; an electromagnetic switching mechanism having two stationary operative positions and rendering in each of said positions one of said two control switches operative, said electromagnetic switching mechanism moving alternately between said positions so that only one of said cam bars is effective at any time for controlling said first electric motor means to shift the carriage, the support, and the tool selected axial distances along the crank shaft, said control switches being operated by said stops of different height to effect rotation of said first electric motor means at different speeds; a stepping switch mechanism for controlling consecutive machining of the crank shaft portions by a rotary tool and having a number of positions corresponding to the maximum number of crank portions of the crank shaft; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

6. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch so that only one of said cam bars is effective at any time for controlling said first electric motor means to shift the carriage, the support, and the tool selected axial distances along the crank shaft; a bridging relay including contact means for bridging one of said control switches; a timing mechanism for checking the positions of said control switches and being connected to said bridging relay for actuating the same when both of said control switches are opened and a predetermined time period has passed; a stepping switch mechanism for controlling consecutive machining of the crank shaft portions by a rotary tool and having a number of positions corresponding to the maximum number of crank portions of the crank shaft; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

7. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch so that only one of said cam bars is effective at any time for controlling said first electric motor means to shift the carriage, the support, and the tool selected axial distances along the crank shaft; a stepping switch mechanism for controlling consecutive machining of consecutive crank shaft portions by a rotary tool and having a number of positions corresponding to the number of crank portions of the crank shaft; a selecting switch for selecting the number of machined crank shaft portions and having a number of positions corresponding to the number of crank portions of the crank shaft, said selecting switch being associated with said stepping switch mechanism, said stepping switch mechanism and said selecting switch being alternately effective in such manner that said stepping switch mechanism moves to its last position directly from the position associated with the last machined crank shaft portion, said stepping switch mechanism presetting in said last position thereof the return of said carriage to its initial position; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

8. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch so that only one of said cam bars is effective at any time for controlling said first electric motor means to shift the carriage, the support, and the tool selected axial distances along the crank shaft; a stepping switch mechanism for controlling consecutive machining of the crank shaft portions by a rotary tool and having a number of positions corresponding to the maximum number of crank portions of the crank shaft, said stepping switch mechanism having a set of stationary contact means associated with said positions thereof; a plurality of selecting switches and terminal switches connected to said stepping switch mechanism and associated with said positions of the same, said selecting switches and terminal switches controlling said second motor means for producing selected transverse motions of said support; a cam drum adapted to be connected to said means for turning said crank shaft so as to turn with said crank shaft; a set of terminal switches actuated by said cam drum and being connected to said second electric motor means for controlling the same, the number of said terminal switches being the same as the number of positions of said stepping switch mechanism, said terminal switches being respectively operatively connected with said stationary contact means for determining the relative angular position of said crank shaft portions, and controlling said motor means for turning the crank shaft to turn the crank shaft when two consecutive crank shaft portions are angularly spaced from each other.

9. A control arrangement as set forth in claim 8 and including relays and auxiliary relays connected to the last stationary contact means associated with the last position of said stepping switch mechanism in such manner that in the event that two consecutive crank shaft portions are angularly spaced the command signal from the respective terminal switch passes through all other terminal switches and stationary contact means to the last stationary contact means of said stepping switch mechanism for actuating said second electric motor means, whereas the respective terminal switch is opened when two consecutive crank shaft portions have the same angular position.

10. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch so that only one of said cam bars is effective at any time for controlling said first electric motor means to shift the carriage, the support, and the tool selected axial distances along the crank shaft; a stepping switch mechanism for controlling consecutive machining of consecutive crank shaft portions by a rotary tool and having a number of positions corresponding to the number of crank portions of the crank shaft, said stepping switch mechanism having a plurality of stationary contacts associated with said positions thereof; a selecting switch for selecting the number of machined crank shaft portions and having a number of positions corresponding to the number of crank portions of the crank shaft, said selecting switch having a plurality of stationary contacts associated with said positions thereof, said selecting switch being associated with said stepping switch mechanism, said stepping switch mechanism and said selecting switch being alternately effective in such manner that said stepping switch mechanism moves to its last position directly from the position associated with the last machined crank shaft portion, said stepping switch mechanism presetting in said last position thereof the return of said carriage to its initial position; a set of other selecting switches respectively associated with said stationary contacts of said first mentioned selecting switch and with said stationary contacts of said stepping switch mechanism, the number of said other selecting switches being in the same as the number of said positions of said stepping switch mechanism and of said first-mentioned selecting switch; a locking relay controlling said stepping switch mechanism and, when actuated, preventing shifting of the same, said locking relay being connected to said other selecting switches and actuated by the same in the positions of said stepping switch mechanism in which repeated operation of said second motor means is required for repeatedly machining a single crank shaft portion, said other selecting switches effecting actuation of said second motor means directly after said first motor means have been operated by said control switches; and a plurality of selecting switches and terminal switches connected to said stepping switch mechanism and associated with said positions of the same, said selecting switches and terminal switches controlling said second motor means for producing selected transverse motions of said support.

11. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; at least two stationary cam bars located in different planes and extending in axial direction; at least two control switches adapted to be secured to the carriage and respectively associated with said cam bars and actuated by the same, each of said two control switches being operatively connected to said first electric motor means for controlling the same independently of the other control switch so that only one of said cam bars is effective at any time for controlling said first electric motor means to shift the carriage, the support, and the tool selected axial distances along the crank shaft; relay means and auxiliary relay means associated with said control switches; a return relay controlling said second motor means for returning said support to a retracted position; a stepping switch mechanism for controlling consecutive machining of the crank shaft portions by a rotary tool and having a number of positions corresponding to the maximum number of crank portions of the crank shaft, said stepping switch mechanism having a locking contact connected to said relay means, said locking contact being adapted to permit passing of a command signal to said relay means in all positions of the stepping switch mechanism except in the last position of the same, and to transfer the command signal to said return relay in said last position of said stepping switch mechanism, said locking contact being operative in said last position of said stepping switch mechanism until the last machining operation has been completed on the last crank shaft portion; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

12. Automatic electrical control arrangement for controlling machining of a crank shaft having a number of crank shaft portions, the automatic electrical control arrangement comprising, in combination, motor means adapted to rotate the crank shaft about the axis thereof for selective rotary indexing thereof; first electric motor means adapted to move the carriage of a machine tool in a direction parallel to the axis of the crank shaft; a second electric motor means adapted to move a tool support on the carriage in a direction transverse to the axis of the crank shaft; two stationary cam bars located in different planes and extending in axial direction, one of said cam bars having a first set of stops associated with the odd numbered crank shaft portions, and the other of said cam bars having a second set of stops associated with the even numbered crank shaft portions; at least two control switches adapted to be secured to the carriage and respectively associated with said cam bars and actuated by said first set of stops and by said second set of stops, respectively, each of said two control switches being operatively connected to said first electric motor means for controlling the same independently of the other control switch; an electromagnetic switching mechanism having two operative positions and rendering in each of said positions one of said two control switches operative, said electromagnetic switching mechanism moving alternately between said positions so that only one of said cam bars is effective at any time for controlling said first electric motor means to shift the carriage, the support, and the tool selected axial distances along the crank shaft; a stepping switch mechanism for controlling consecutive machining of consecutive crank shaft portions by a rotary tool and having a number of positions corresponding to the number of crank portions of the crank shaft, said stepping switch mechanism having a plurality of stationary contacts associated with said positions thereof; a selecting switch for selecting the number of machined crank shaft portions and having a number of positions corresponding to the number of crank portions of the crank shaft, said selecting switch having a plurality of stationary contacts associated with said positions thereof, said selecting switch being associated with said stepping switch mechanism, said stepping switch mechanism and said selecting switch being alternately effective in such manner that said stepping switch mechanism moves to its last position directly from the position associated with the last machined crank shaft portion, said stepping switch mechanism presetting in said last position thereof the return of said carriage to its initial position; a set of other selecting switches respectively associated with said stationary contacts of said first mentioned selecting switch and with said stationary contacts of said stepping switch mechanism, the number of said other selecting switches being the same as the number of said positions of said stepping switch mechanism and of said first-mentioned selecting switch; a locking relay controlling said stepping switch mechanism and, when actuated, preventing shifting of the same, said locking relay being connected to said other selecting switches and actuated by the same in the poisitions of said stepping switch mechanism in which repeated operation of said second motor means is required for repeatedly machining a single crank shaft portion, said other selecting switches effecting actuation of said second motor means directly after said first motor means have been operated by said control switches; a plurality of selecting switches and terminal switches connected to said stepping switch mechanism and associated with said positions of the same, said selecting switches and terminal switches controlling said second motor means for producing selected transverse motions of said support; and indexing means including cam means adapted to be connected to the crank shaft for turning movement and an electric circuit means including switch means controlled by said cam means and connected to said motor means for rotating the crank shaft to effect turning of the crank shaft when two consecutive crank shaft portions are angularly spaced from each other.

References Cited in the file of this patent

UNITED STATES PATENTS

| | | |
|---|---|---|
| 2,029,335 | Oberhoffken et al. | Feb. 4, 1936 |
| 2,142,050 | Garside et al. | Dec. 27, 1938 |
| 2,503,889 | Silven et al. | Apr. 11, 1950 |
| 2,659,277 | Miller | Nov. 17, 1953 |